June 9, 1931.  C. H. LANE ET AL  1,808,958
WELL SCREEN WASHER
Filed Sept. 3, 1929

INVENTOR.
Charles H. Lane
Charles H. Reynolds
BY
Hardway Cather
ATTORNEYS.

Patented June 9, 1931

1,808,958

UNITED STATES PATENT OFFICE

CHARLES H. LANE AND CHARLES H. REYNOLDS, OF HOUSTON, TEXAS

WELL SCREEN WASHER

Application filed September 3, 1929. Serial No. 390,012.

This invention relates to new and useful improvements in a well screen washer.

One object of the invention is to provide a device of the character described adapted to be let down into a screen set in a well bore, and through which a washing fluid may be applied to the screen from within said screen and forced outwardly through the screening surface to unclog the screen and to wash the formation that may be packed around said screen from the screen so as to permit the inflow of oil or other fluid from the surrounding strata in through the screen and up to the ground surface.

Another object of the invention is to provide a device of the character described through which the washing fluid may be applied and confined to a selected section on the screen so that the screen to be washed may be washed a section at a time, said device being of such construction that it may be elevated and lowered in the screen to the end that the screen may be washed throughout its length, a section at a time A further feature of the invention resides in the provision of spaced expansible packing members that may be simultaneously set so as to confine the washing fluid to the area or the screen between them and which may be readily contracted simultaneously to permit the easy movement of the device from one location in the screen to another.

A still further feature of the invention resides in the provision of means whereby said packers may be simultaneously expanded or set against the inner walls of the screen through the pressure of the washing fluid.

With the above and other objects in view, this invention has particular relation to certain novel features of construction, operation and arrangement of parts, an example of which is given in this specification and illustrated in the accompanying drawings wherein—

Figure 1:
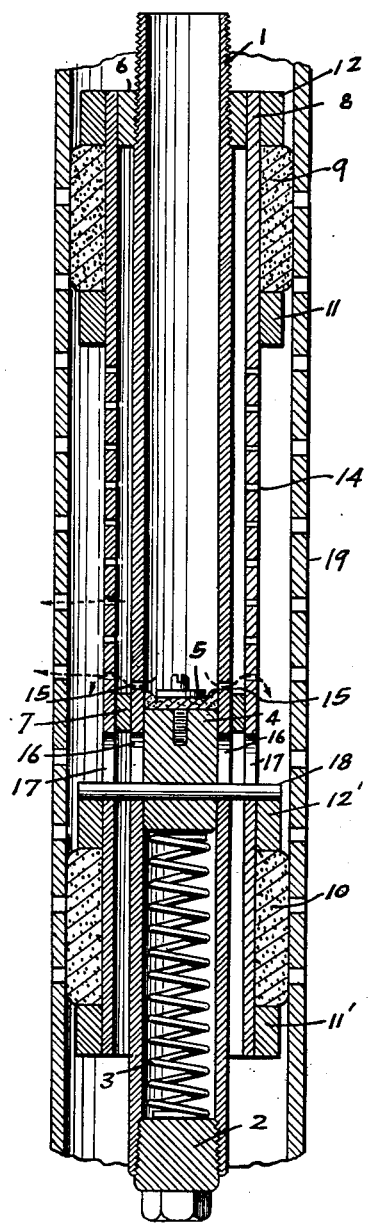
Figure 2:
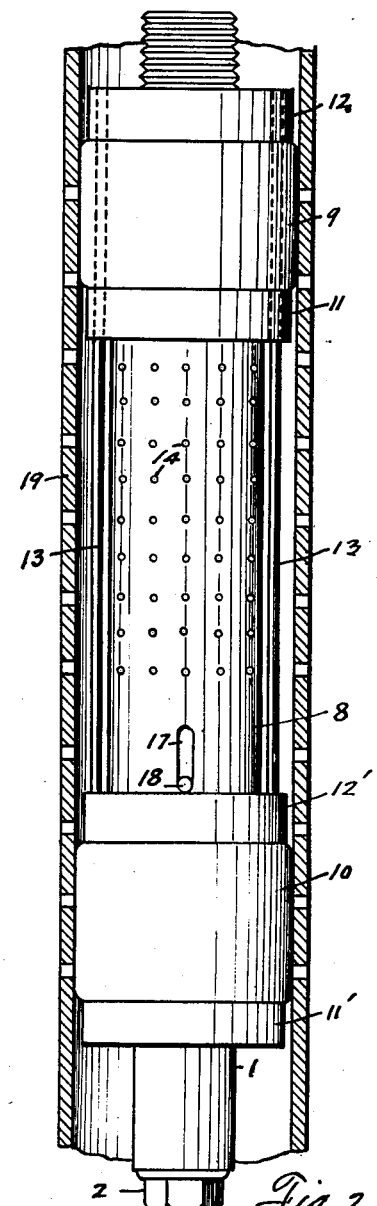

Figure 1 shows a vertical sectional view of the device set in position in a well screen for washing the same, and Figure 2 shows a side elevation thereof set in a well screen said screen being shown in section, Referring now more particularly to the drawings, wherein like numerals of reference designate similar parts in each of the figures, the numeral 1 designates a tubular stem whose lower end may be closed as by means of a plug 2 and whose upper end is threaded for the connection of a tubular string thereto, which extends to the ground surface. Within the stem 1 and seated on the plug 2 there is a yieldable member, as for example a coil spring 3 seated on which is a plunger 4 whose upper end may have a conventional cup ring 5 secured thereto. On the stem 1 are the upper and lower spacer rings 6, 7 and shrunk, or otherwise secured around these rings there is a tubular packer support 8 which extends down beneath the spacer ring 7 and which is spaced from the stem 1. There are the upper and lower expansible packers 9, 10 formed of any suitable packing material and confined between the anular fixed abutments 11, 11' on one side and the movable annular abutments 12, 12' on the other side. Said abutments surround the packer support 8 and said movable abutments are connected by the rods 13, 13 which are attached, at their upper ends, to the upper abutment 12 and which work through bearings in the packer 9 and abutment 11 and whose lower ends are attached to the lower abutment 12'. Between the abutment 11, 12' the packer support is provided with the perforations 14. Above the spacer ring 7 the stem is provided with outlet ports 15 and beneath said spacer 7 the stem and packer support have the aligned vertical slots 16, 17. A cross pin 18 is fitted through the plunger 4 and its ends extend through the respective slots 16, 17 and rest on the movable abutment 12'. The coil spring 3 normally holds the plunger 4 elevated to block the outlets 15 with the pin 18 at the upper ends of the slots 16, 17. In this condition the packers 9, 10 will be contracted and will readily pass down into the screen.

In operation, the upper end of the stem 1 may be connected to the lower end of a pipe and let down into the screen to the desired location. Fluid, under pressure, may then be forced down through said pipe and stem and the fluid will force the plunger 4 downwardly, the cross pin 18 acting against the movable abutment 12' to force it downwardly and the upper abutment 12 will be moved downwardly by the rods 13, as the abutment 12' moves downwardly. The packers will thus be expanded against the inner sides of the wall 13 to form fluid tight joints. The plunger in this position will clear the outlet ports 15 and permit the fluid to pass out through said ports and through the perforated packer support and will fill the space within the screen which is thus confined and will be forced out through the screen openings and will wash said screen openings free of clogging material and will wash away and loosen up the formation packed around the outside of the screen. When the pressure fluid has been relieved the spring 3 will elevate the plunger releasing the packers and permitting them to contract so that the device may be moved up or down and the screen washed, as hereinbefore described, from end to end and when the washing operation has been completed the pressure may be again relieved and the apparatus withdrawn from the well.

The drawings and description disclose what is now considered a preferred form of the invention, by way of illustration only, while the broad principle of the invention will be defined by the appended claims.

What we claim is:—

1. A well screen washer including a tubular stem having an outlet port, a yieldably mounted plunger therein normally blocking said port, a tubular perforated packer support around and spaced from the stem, spaced expansible packers around said stem support, means operable by said plunger and effective to simultaneously expand said packers.

2. A well screen washer including a tubular stem having an outlet port, a yieldably mounted plunger therein normally closing said port, said plunger being exposed to fluid, under pressure, in the stem and being movable thereby into position to open said port to permit the passage of the pressure fluid therethrough, a tubular packer support around and anchored to and spaced from the stem, said support being perforated, spaced packers around, and secured on, said support, operative connections through which the plunger acts, when moved to said position, to simultaneously expand said packers.

3. A well screen washer including a tubular stem having an outlet port, a yieldably mounted plunger therein normally closing said port, said plunger being exposed to fluid, under pressure, in the stem and being movable thereby into position to open said port to permit the passage of the pressure fluid therethrough, a tubular packer support around and anchored to and spaced from the stem, said support being perforated, spaced packers around, and secured on, said support, operative connections through which the plunger acts, when moved to said position, to simultaneously expand said packers, and means for confining the fluid passing out through the stem port and directing the same out through the perforations of the packer support.

4. A well screen washer including a packer support, spaced packers thereon, fixed abutments on the support adjacent the respective packers, on one side, movable abutments on said support adjacent the other sides of the respective packers, means for supplying a washing fluid, under pressure, to the space between the packers, and means operable by said fluid and connected with said movable abutments, and effective, when so operated, to force said movable abutment against the adjacent packings to expand the same.

5. A well screen washer including a pair of expansible packers adapted to be inserted into a tubular screen and spaced apart, means for maintaining said packers in assembled relation, means having a fluid passageway through which washing fluid, under pressure may be conducted into the screen to be washed between said packers, yieldably mounted means normally closing said passageway, but subject to the pressure of said fluid and operable thereby into position to open, said passageway, and means operable by said closing means and effective to expand said packers when operated to said open position.

6. A well screen washer including a pair of expansible packers adapted to be inserted into a tubular screen and spaced apart, means for maintaining said packers in assembled relation, means having a fluid passageway through which washing fluid, under pressure, may be conducted into the screen to be washed between said packers, yieldably mounted means normally closing said passageway, but subject to the pressure of said fluid and operable thereby into position to open, said passageway, and means operable by said closing means and effective to expand said packers when operated to said open position, said packer expanding means including confining abutments operable against said respective packers.

7. A well screen washer including a pair of expansible packers adapted to be inserted into a tubular screen and spaced apart, means for maintaining said packers in assembled relation, means having a fluid passageway through which washing fluid under pressure may be conducted into the screen to be washed between said packers, yieldably mounted means normally closing said passageway, but subject to the pressure of said fluid and operable thereby into position to open, said passageway, and means operable by said closing means and effective to expand said packers when operated to open position, said packer expanding means including confining abutments operable against said respective packers, and connected together.

In testimony whereof we have signed our names to this specification.

CHARLES H. LANE.
CHARLES H. REYNOLDS.